(12) United States Patent
Koepfler et al.

(10) Patent No.: US 9,331,540 B2
(45) Date of Patent: May 3, 2016

(54) END WINDING CORONA PROTECTION

(71) Applicant: ALSTOM Renewable Technologies, Grenoble (FR)

(72) Inventors: Andreas Koepfler, Waldshut (DE); Jeremy Poux, Zurich (CH); Thomas Lugand, Zurich (CH)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 0 days.

(21) Appl. No.: 14/315,627

(22) Filed: Jun. 26, 2014

(65) Prior Publication Data

US 2015/0008782 A1 Jan. 8, 2015

(51) Int. Cl.
*H02K 3/40* (2006.01)

(52) U.S. Cl.
CPC .............. *H02K 3/40* (2013.01); *H02K 2213/03* (2013.01)

(58) Field of Classification Search
CPC ........ H02K 3/40; H02K 2213/03; H02K 3/32
USPC .......................................................... 310/196
See application file for complete search history.

(56) References Cited

U.S. PATENT DOCUMENTS

| | | | |
|---|---|---|---|
| 4,207,482 A * | 6/1980 | Neumeyer et al. | 310/45 |
| 4,760,296 A * | 7/1988 | Johnston et al. | 310/45 |
| 6,140,733 A * | 10/2000 | Wedde et al. | 310/196 |
| 2008/0106157 A1 | 5/2008 | Higashimura et al. | |
| 2008/0230253 A1* | 9/2008 | Williams et al. | 174/116 |
| 2011/0074241 A1 | 3/2011 | Harakawa et al. | |

FOREIGN PATENT DOCUMENTS

| | | |
|---|---|---|
| DE | 30 45 462 | 6/1981 |
| EP | 2333938 | 6/2011 |
| JP | S54-150602 | 11/1979 |
| JP | S6122733 | 1/1986 |
| JP | S61177134 | 8/1986 |
| JP | S62-104449 | 5/1987 |
| JP | S62-196051 | 8/1987 |
| JP | H03-032336 | 2/1991 |
| JP | H09-131014 | 5/1997 |
| JP | 2003-092849 | 3/2003 |
| JP | 2003-164091 | 6/2003 |
| JP | 2011-097821 | 5/2011 |
| RU | 2088024 C1 | 8/1997 |
| RU | 2291542 C2 | 1/2007 |
| SU | 1035730 A1 | 8/1983 |

OTHER PUBLICATIONS

Office action issued from Japanese Patent Office dated May 18, 2015 for JP Application No. 2014-137686.
Notice of Allowance issued from Russian Patent Office dated Sep. 22, 2015 for RU Application No. 2014126838.

* cited by examiner

*Primary Examiner* — Terrance Kenerly
(74) *Attorney, Agent, or Firm* — Buchanan Ingersoll & Rooney PC

(57) ABSTRACT

An end winding corona protection including a winding of a rotating electric machine, having a conductor and a ground-wall insulation surrounding the conductor, an end winding corona protection arranged on the outer surface of the ground-wall insulation, the end winding corona protection comprising a first layer characterized in that the surface resistance of the first layer is in the range of 10 Ohm to 80 Ohm, and in that the end winding corona protection further comprises a second layer arranged on the outer surface of the first layer, wherein the second layer is made of semiconductive material, and wherein third layer is arranged on the outer surface of the second layer and made of medium resistive material.

13 Claims, 2 Drawing Sheets

END WINDING CORONA PROTECTION

CROSS-REFERENCE TO RELATED APPLICATIONS

This application claims priority to European application 13174846.9 filed Jul. 3, 2013, the contents of which are hereby incorporated in its entirety.

TECHNICAL FIELD

The present disclosure relates to a stator or to a rotor winding of an electric generator. More particularly, the present disclosure relates to an improved end winding corona protection of a rotor of an asynchronuous electric machine.

BACKGROUND

State-of-the-art electric energy conversion relies on a three-phase power network with alternating currents (AC) at 50 Hz or 60 Hz frequency and a voltage levels ranging from several hundreds of Volts to hundreds of thousands of Volts. The conversion of rotating mechanical energy into electric energy and vice versa is done by generators and by motors respectively. Those rotating machines can be divided into asynchronous and synchronous apparatuses. The three-phase windings of such machines comprise Copper conductors which require groundwall insulation especially in the slot section. When increasing the rated power output of such a machine, the voltage level increases so as to minimise use of material and to maximise efficiency.

Machines with a voltage level higher than 1000V require special field grading measures in the slot section in addition to the groundwall insulation. A slot corona protection is necessary to control the capacitive currents on both sides of the groundwall insulation and the axial voltage induced by the rotating magnetic field. A slot corona protection therefore establishes an electrode on the outer surface of the winding. Its surface resistance of 100Ω to 10 000Ω ensures a continuous electric connection of the slot corona protection to the grounded slot wall and limits the axial current flow. In addition, at the end winding a second type of field grading technology becomes necessary in order to control the voltage drop from the grounded slot section to the end connections. The end connections may even be on high-voltage potential. The commonly used solution for the end winding corona protection employs a resistive field grading material with a nonlinear resistance characteristic.

Both the end winding corona protection and the slot corona protection are designed to control surface currents in a way that no visible discharges (corona, arcing) occur and that safe and long-term operation of the machine is achieved. These systems are well known by each machine supplier and they are key technologies in view of machine design. They have been developed and have been optimised since the start of the electric energy conversion with high-voltage rotating machines. End winding and slot corona protection systems are well-defined for AC sinus voltages ranging from 16⅔ Hz to 60 Hz.

Synchronous rotating machines generate the magnetic field through rotor pole windings. The number of rotor poles and the frequency of the stator magnetic field defines the number revolutions per minutes (rpm) of the rotating machine.

With the advent of new power converters, the rotors of motors and of generators can be supplied with (sinusoidal) currents and voltages of varying frequency and phase angles. Accordingly, the number of revolutions per minute can now vary widely. Depending on the type of power converter either the current or the voltage shape may no longer be sinusoidal. The shapes of current or of voltage are instead determined by pulse width modulation (PWM).

Pulse width modulation involves switching between different voltage levels and results in rapid changes of voltage (high dU/dt). Consequently, capacitive currents and voltages will be much higher compared to sinus voltages at 50 Hz or at 60 Hz. In addition, the switching frequency is typically in the range of several hundred Hz. Due to these challenges the design of the groundwall insulation and also of the slot corona protection and of the end winding corona protection changes. New designs and technical developments are necessary to meet these requirements.

In pump storage plants (PSP) the standard synchronous machine can be replaced by a double-fed asynchronous machine. This type of machine allows for variable speed operation. The rotating part of the standard synchronous machine is in this case replaced by a three-phase high-voltage (at around 4-5 kV) winding supplied by a power converter. Voltage changes then occur at dU/dt≈1 kV/μs and switching frequencies of several hundred Hz.

The standard design for supporting the windings generally employs glass fibre cords and plates. For the rotor winding of double fed asynchronous machines, the high mechanical stress due to the centrifugal forces and vibrations requires the use of steel materials for mechanical support. This electric conductivity of these support materials results in new electric issues in the end winding area.

The present disclosure is oriented towards providing the aforementioned needs and towards overcoming the aforementioned difficulties.

SUMMARY

The object is a system that allows control of the voltage drop caused by power converter driven pulses on the surface of an end winding. The ultimate object is control of the voltage drop such that no discharges occur.

The solution also needs to ensure any surface currents flow to the stator core and not through the metallic bolts supporting the end winding. Erosion due to contact arcing would otherwise become a problem.

This object and other objects are achieved by an end winding corona protection according to the claim 1 of this application.

In addition, the space between two metallic bolts is limited. The cross section of the copper conductor inside a winding is given by the maximum current and cannot change. The thickness of the groundwall insulation of the winding is also given because of dielectric constraints. It follows the new end winding corona protection has to be as thin as possible in view of the space requirements for the assembly of a winding.

It is yet another object of this disclosure to provide an end winding corona protection that can be made up of layers of tapes and of layers of paint.

It is yet another object of this disclosure to provide an end winding corona protection which at its end connectors can withstand (sinusoidal) AC voltages of 4 kV to 5 kV.

It is yet another object of this disclosure to provide an end winding corona protection that is suitable for windings carryings currents up to 3 kA.

It is another object of this disclosure to provide an electric machine with the above-mentioned end winding corona protection.

It is yet another object of this disclosure that this machine is an asynchronuous machine.

It is another object of this disclosure to provide an electric machine with the above-mentioned end winding corona protection applied to the rotor of the electric machine.

It is another object of this disclosure to provide an electric machine with the above-mentioned end winding corona protection applied to the stator of the electric machine.

It is yet another object of this disclosure to provide an electric machine whose end winding can be supported by steel structures.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein:

FIG. 2 also depicts the mechanical support of the end-winding.

DETAILED DESCRIPTION

Figure 1:
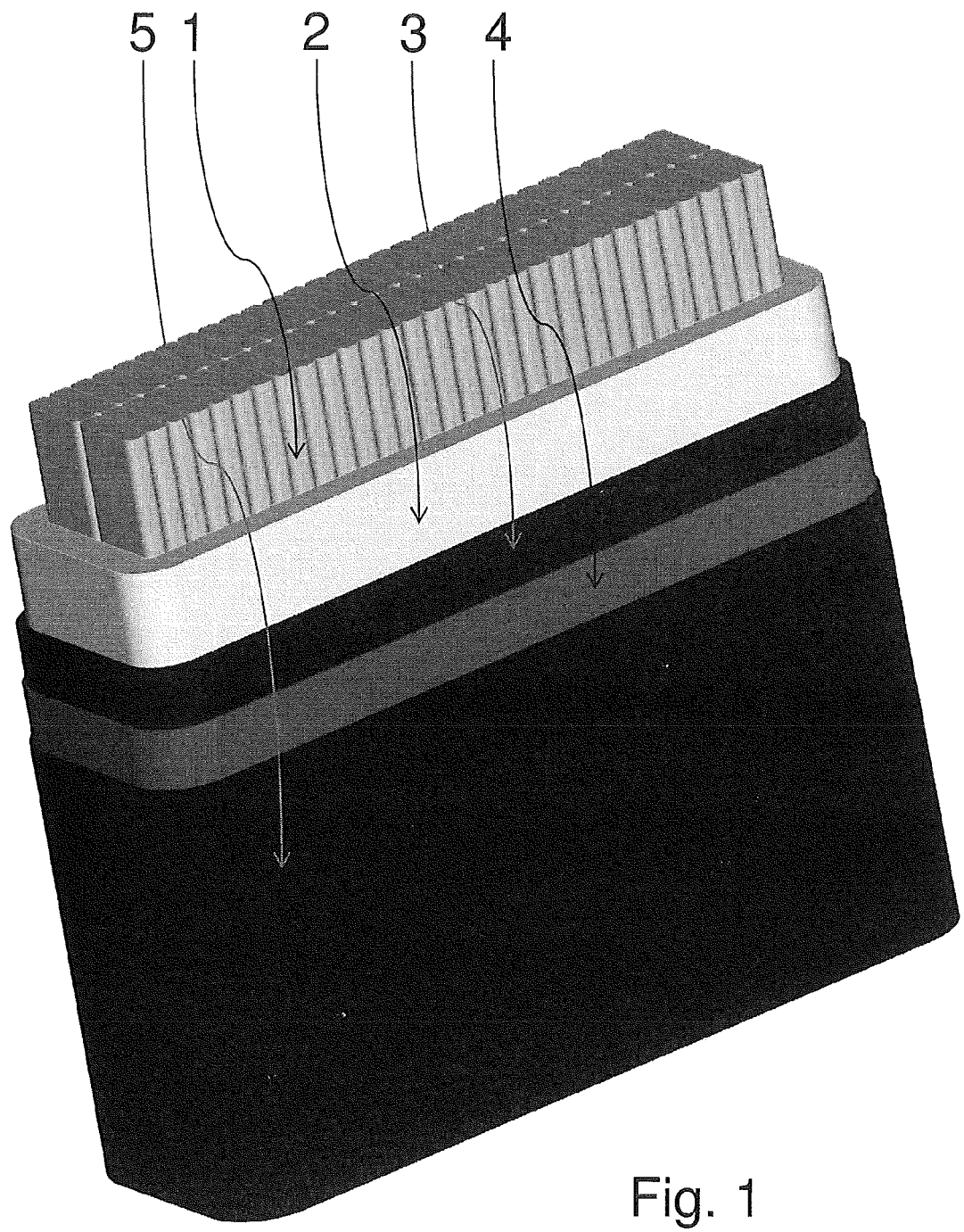
FIG. 1 provides a three-dimensional drawing of a winding with an end winding corona protection.

FIG. 1 is a three-dimensional illustration of a winding with an end winding corona protection. A bundle 1 of strands is arranged in the centre of the winding and forms a conductor. The strands are preferably made of Copper or of a Copper alloy and carry the current through the winding. Typically, a winding of a rotating machine carries currents of several kA. Those currents may be alternating currents as well as direct currents.

The strands are typically on a potential ranging from several hundred V to several kV. That is why the strands must be electrically insulated against the outside. The groundwall insulation 2 of a winding ensures such electrical insulation. The thickness of the groundwall insulation depends on the voltage of the strands. Typically, the thickness of the groundwall insulation is several millimeters.

The end winding corona protection is made up of three layers 3, 4, 5. The innermost layer 3 is a highly conductive layer. Its surface resistance is in the range of $10\Omega$ to $200\Omega$. More preferably, the surface resistance of the innermost layer is in the range of $20\Omega$ to $80\Omega$. Yet more preferably, the surface resistance of the innermost layer is in the range of $30\Omega$ to $80\Omega$. The purpose of this layer is limitation of the voltage differences along the surface of the end winding. This is particularly relevant to machines fed by power converters, where sharp rises in voltage (dU/dt) may result in excessive capacitive currents and/or voltages on the surface of the end winding corona protection.

The second layer 4 is made of a semiconductive material. The currents through this layer non-linearly depend on voltage. The purpose of this layer is limitation of currents perpendicular to the surface of the end winding. That is why the resistance of this layer perpendicular to the surface is critical. The resistance typically is in the range of $100 \, M\Omega/mm^2$ to $10^6 \, M\Omega/mm^2$. More preferably, the resistance is in the range of $1000 \, M\Omega/mm^2$ to $10^5 \, M\Omega/mm^2$. Yet more preferably, the resistance is in the range of $1000 \, M\Omega/mm^2$ to $10^4 \, M\Omega/mm^2$.

The outermost layer 5 is again made of a medium resistive material. The surface resistance of the outermost layer 5 is in the range of 1 k$\Omega$ to 10 k$\Omega$. More preferably, the surface resistance is in the range of 1 k$\Omega$ to 8 k$\Omega$. Yet more preferably, the surface resistance is in the range of 2 k$\Omega$ to 5 k$\Omega$. The purpose of the outermost layer is limitation of the voltage gradients on the outermost surface of the end winding. Yet another purpose of the outermost layer is protection against mechanical abrasion and/or erosion.

The aforementioned layers of the end winding corona protection can be applied in the form of tapes or as paint. It is also possibly to combine layers made of tape and layers made up of paint. The choice of tapes vs paint has to be made factoring in mechanical abrasion, contact resistances between tape layers and overall thickness of the end winding corona protection.

Figure 2:
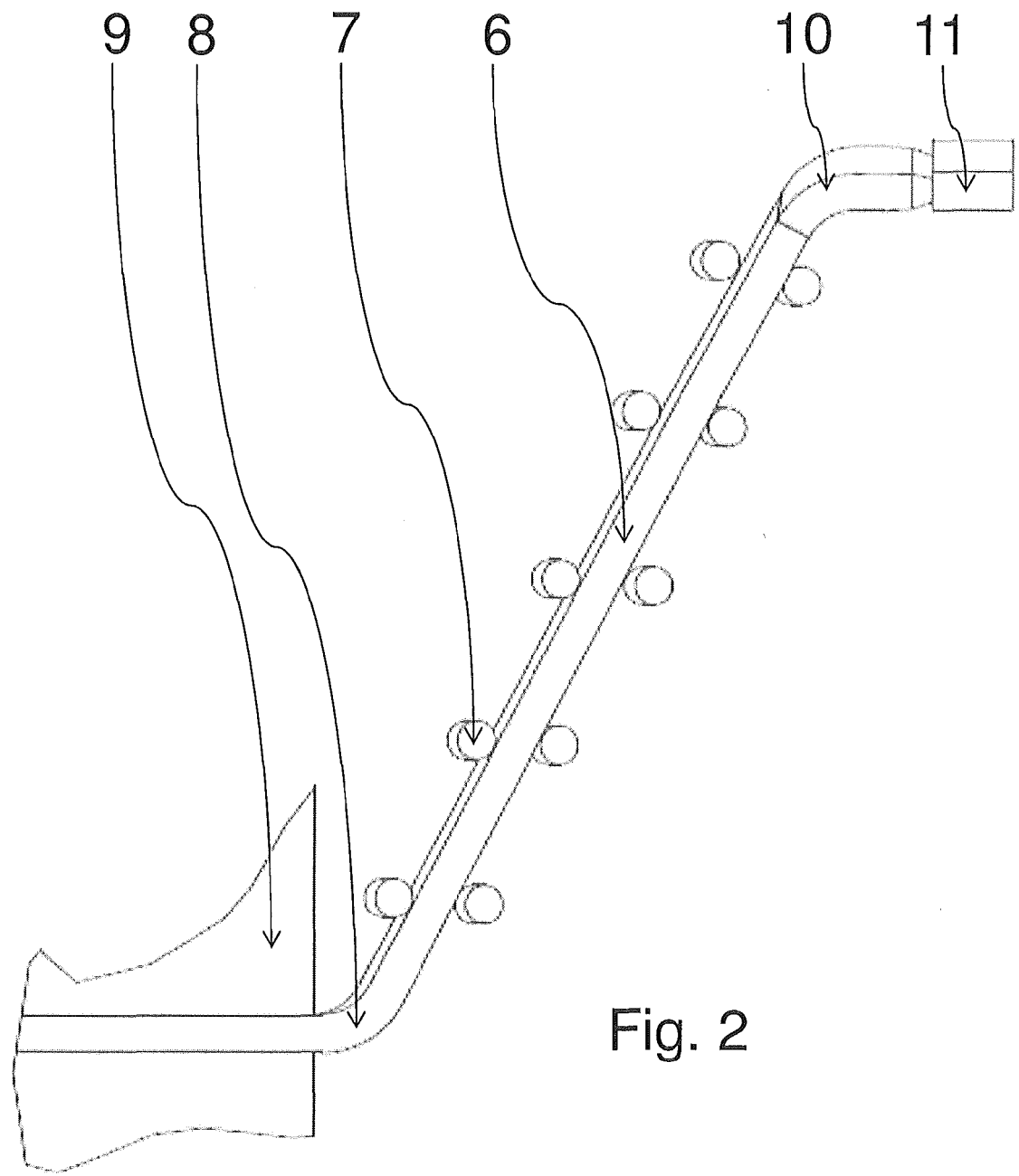
FIG. 2 is a schematic drawing of a winding with and end winding.

In a preferred embodiment, the overall thickness of the aforementioned layers is limited to 0.8 mm. In yet another embodiment, the overall thickness of the aforementioned layers is limited to 0.5 mm. In yet another embodiment, the overall thickness of the aforementioned layers is limited to 0.3 mm FIG. 2 schematically shows the end winding of a rotor. On FIG. 2 the end winding 6 is mechanically supported by a plurality of metallic bolts 7. The main purpose of the bolts 7 is to secure the end winding 6 against centrifugal forces. In rotating machines, such forces may actually result in end winding vibrations. Those vibrations become destructive if their magnitude exceeds a limit.

These bolts 7 may but need not make contact with the outer surface of the end winding 7. Also, the metallic bolts may or may not be connected to earth. In case the metallic bolts are not connected to earth, they will be on floating electric potential. The surface resistance of the outermost layer 5 shown on FIG. 1 is chosen so as to limit currents between adjacent metallic bolts 7. If the surface resistance of the outermost layer 5 was too low, currents between adjacent metallic bolts 7 would become destructive.

The winding as shown on FIG. 2 also has a bent part 8. Behind that bent part 8, the winding is inserted in a slot section 9. That slot section would typically be made of layers of laminated steel.

In a preferred embodiment, the three-layer end winding corona protection reaches 200 mm into the slot section 9. In another embodiment, the three-layer end winding corona protection reaches 500 mm into the slot section 9. In yet another embodiment, the three-layer end winding corona protection reaches 50 mm into the slot section 9.

The portion of the end winding corona protection in the slot section allows surface currents to flow predominantly through the slot section 9 and not through the metallic bolts 7. It is important to note that the slot section 9 is essentially on earth potential.

Another bent part 10 is found on the other side of the end winding. That bent part is no longer covered with a three-layer end winding corona protection. It is, however, covered with groundwall insulation 2 as shown on FIG. 1. In another envisaged embodiment, the bent part 10 is at least partly covered with a three-layer end winding corona protection. Behind the bent part 10, an end connector 11 terminates the end winding. The end connector 11 is basically used to connect different parts of the winding arranged in different slots among each other. The end connector 11 may also be used to connect the winding to the terminals of the machine.

The arrangement as shown on FIG. 2 belongs to the rotor of an electric machine. It is understood the same solution can also be applied to the stator of an electric machine.

The invention claimed is:

1. A winding of a rotating electric machine, comprising a conductor and a groundwall insulation surrounding the conductor, and an end winding corona protection arranged on the outer surface of the groundwall insulation, wherein the end winding corona protection comprising a first layer;

wherein the surface resistance of the first layer is in the range of 10 Ohm to 200 Ohm, and in that the end winding corona protection further comprises a second layer arranged on the outer surface of the first layer, wherein the second layer is made of semiconductive material with a resistance of the second layer perpendicular to the surface is in the range of 100 MOhm/mm$^2$ to 10$^6$ MOhm/mm$^2$, and wherein the end winding corona protection further comprises a third layer arranged on the outer surface of the second layer, the third layer having a surface resistance in the range of 1 kOhm to 10 kOhm.

2. A winding according to claim 1,
wherein the surface resistance of the first layer is in the range of 20 Ohm to 80 Ohm.

3. A winding according to claim 2,
wherein the surface resistance of the first layer is in the range of 30 Ohm to 80 Ohm.

4. A winding according to claim 1,
wherein the resistance of the second layer perpendicular to the surface is in the range of 1000 MOhm/mm2 to 10$^5$ MOhm/mm$^2$.

5. A winding according to claim 4,
wherein the resistance of the second layer perpendicular to the surface is in the range of 1000 MOhm/mm2 to 10$^4$ MOhm/mm$^2$.

6. A winding according to claim 1,
wherein the third layer has a surface resistance in the range of 1 kOhm to 8 kOhm.

7. A winding according to claim 6,
wherein the third layer has a surface resistance in the range of 2 kOhm to 5 kOhm.

8. A winding according to claim 1,
wherein at least one layer is applied in the form of a tape.

9. A winding according to claim 1,
wherein at least one layer is applied in the form of paint.

10. A winding according to claim 1,
wherein the overall thickness of all three layers is 0.8 mm or less.

11. A winding according to claim 10,
wherein the overall thickness of all three layers is 0.5 mm or less.

12. A winding according to claim 11,
wherein the overall thickness of all three layers is 0.3 mm or less.

13. A rotor of an electric machine with a winding according to claim 1.

* * * * *